US012812095B2

(12) United States Patent
Ahn et al.

(10) Patent No.: US 12,812,095 B2
(45) Date of Patent: Nov. 24, 2026

(54) METHOD AND APPARATUS FOR VIDEO CODING USING ADAPTIVE INTRA PREDICTION PRECISION

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 283 days.

(21) Appl. No.: 18/375,651

(22) Filed: Oct. 2, 2023

(65) Prior Publication Data

US 2024/0031564 A1 Jan. 25, 2024

Related U.S. Application Data

(63) Continuation of application No. PCT/KR2022/004442, filed on Mar. 29, 2022.

(30) Foreign Application Priority Data

Apr. 2, 2021 (KR) ........................ 10-2021-0043657
Mar. 28, 2022 (KR) ........................ 10-2022-0038224

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/176* (2014.11); *H04N 19/593* (2014.11)

(58) Field of Classification Search
None
See application file for complete search history.

(56) References Cited

U.S. PATENT DOCUMENTS

2012/0044993 A1* 2/2012 Sato ........................ H04N 19/82 375/E7.243
2017/0353719 A1* 12/2017 Liu ...................... H04N 19/156
(Continued)

FOREIGN PATENT DOCUMENTS

KR 20160146590 A 12/2016
KR 20170131473 A 11/2017

OTHER PUBLICATIONS

B Bross et al., Versatile Video Coding Editorial Refinements on Draft 10, Joint Video Experts Team (JVET) of ITU-T SG 16 WP 3 and ISO/IEC JTC 1/SC 29; Document: JVET-T2001-v2; Nov. 24, 2020; pp. 1-511.
(Continued)

*Primary Examiner* — Chikaodili E Anyikire
(74) *Attorney, Agent, or Firm* — Lempia Summerfield Katz LLC

(57) ABSTRACT

A method and an apparatus for video coding using adaptive intra prediction precision are disclosed. The video coding method and the apparatus select a precision mode for directionality of an intra prediction mode of a current block according to directional prediction modes of restored neighboring blocks. The video coding method and the apparatus adaptively use precision of the directionality based on the selected precision mode in intra prediction of a current block.

16 Claims, 17 Drawing Sheets

(51) Int. Cl.
*H04N 19/176* (2014.01)
*H04N 19/593* (2014.01)

(56) References Cited

U.S. PATENT DOCUMENTS

| | | | | |
|---|---|---|---|---|
| 2018/0048915 | A1 | 2/2018 | Jeon et al. | |
| 2018/0176601 | A1 | 6/2018 | Jeong et al. | |
| 2018/0255304 | A1* | 9/2018 | Jeon | H04N 19/134 |
| 2019/0104303 | A1 | 4/2019 | Xiu | |
| 2019/0166375 | A1* | 5/2019 | Jun | H04N 19/13 |
| 2020/0260114 | A1 | 8/2020 | Zhao et al. | |
| 2020/0366889 | A1* | 11/2020 | Huang | H04N 19/109 |
| 2021/0274205 | A1* | 9/2021 | Park | H04N 19/132 |
| 2022/0224938 | A1* | 7/2022 | Ruiz Coll | H04N 19/463 |
| 2024/0137654 | A1* | 4/2024 | Kim | H04N 19/103 |

OTHER PUBLICATIONS

International Search Report and Written Opinion cited in corresponding international app No. PCT/KR2022/004442; Jul. 25, 2022; 12 pp.

Office action cited in Japanese application No. 2023-561050; Dec. 2, 2025; 4 pp.

* cited by examiner

METHOD AND APPARATUS FOR VIDEO CODING USING ADAPTIVE INTRA PREDICTION PRECISION

CROSS-REFERENCE TO RELATED APPLICATIONS

This application is a Continuation of International Application No. PCT/KR2022/004442 filed on Mar. 29, 2022, which claims priority to Korean Patent Application No. 10-2021-0043657 filed on Apr. 2, 2021, and Korean Patent Application No. 10-2022-0038224 filed on Mar. 28, 2022, the entire disclosures of each of which are incorporated herein by reference.

TECHNICAL FIELD

The present disclosure relates to a video encoding method and an apparatus using adaptive intra prediction precision.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In video compression technology, intra prediction predicts pixel values of a current block using restored pixel values around the current block in order to remove spatial redundancy. The intra prediction can be divided into non-directional prediction and directional prediction. In the case of the non-directional prediction, the pixel values of the current block may be predicted using an average of neighboring sample values or using a weighted sum using weights or a plane equation. In the case of the directional prediction, the pixel values of the current block may be predicted using directions at various angles such as vertical, horizontal, and diagonal directions.

With the development of the video compression technology, the VVC technology uses intra prediction based on 65 directions obtained by subdividing an angle, in addition to vertical, horizontal and diagonal directions. The VVC technology may also use 28 additional directions according to a shape of a block. In other words, the VVC technology improves prediction performance by using a large number of directions, up to 93 in total. However, since indexes in the directions should be additionally encoded, there is a problem in that coding efficiency is degraded. Therefore, a method of adaptively representing directions at various angles needs to be considered in order to improve the coding efficiency.

SUMMARY

The present disclosure seeks to provide a video encoding method and an apparatus for selecting a precision mode for directionality of an intra prediction mode of a current block according to directional prediction modes of restored neighboring blocks. The video encoding method and the apparatus adaptively use precision of the directionality based on the selected precision mode in intra prediction of the current block.

At least one aspect of the present disclosure provides an intra prediction method performed by a video decoding apparatus. The intra prediction method comprises decoding an intra prediction mode and an adaptive precision flag of a current block from a bitstream and checking the intra prediction mode. The adaptive precision flag indicates whether or not to use adaptive precision for directionality of the intra prediction mode. The intra prediction mode is classified into a horizontal directional prediction mode and a vertical directional prediction mode with reference to a top-left intra prediction mode. When the intra prediction mode is a directional prediction mode, the intra prediction method also comprises: determining a precision mode for the directionality according to directional prediction modes of neighboring blocks of the current block; determining precision for the directionality of the intra prediction mode using the precision mode and the adaptive precision flag; and generating a prediction block of the current block using the precision and the intra prediction mode.

Another aspect of the present disclosure provides a video decoding apparatus. The video decoding apparatus comprises an entropy decoder configured to decode an intra prediction mode and an adaptive precision flag of a current block from a bitstream. The adaptive precision flag indicates whether or not to use adaptive precision for directionality of the intra prediction mode. The intra prediction mode is classified into a horizontal directional prediction mode and a vertical directional prediction mode with reference to an top-left intra prediction mode. The video decoding apparatus also comprises and an intra predictor configured to check the intra prediction mode. When the intra prediction mode is a directional prediction mode, the intra predictor is configured to: determine a precision mode for the directionality according to directional prediction modes of neighboring blocks of the current block; determine precision for the directionality of the intra prediction mode using the precision mode and the adaptive precision flag; and generate a prediction block of the current block using the precision and the intra prediction mode.

Yet another aspect of the present disclosure provides an intra prediction method performed by a video encoding apparatus. The intra prediction method comprises acquiring an intra prediction mode and an adaptive precision flag of a current block from a high level and checking the intra prediction mode. The adaptive precision flag indicates whether or not to use adaptive precision for directionality of the intra prediction mode. The intra prediction mode is classified into a horizontal directional prediction mode and a vertical directional prediction mode with reference to an top-left intra prediction mode. When the intra prediction mode is a directional prediction mode, the intra prediction method also comprises: determining a precision mode for the directionality according to directional prediction modes of neighboring blocks of the current block; determining precision for the directionality of the intra prediction mode using the precision mode and the adaptive precision flag; and generating a prediction block of the current block using the precision and the intra prediction mode.

As described above, the present disclosure provides a video coding method and an apparatus for selecting a precision mode for directionality of an intra prediction mode of a current block according to directional prediction modes of restored neighboring blocks. The video encoding method and the apparatus adaptively use precision of the directionality based on the selected precision mode in intra prediction of a current block to improve coding efficiency.

DETAILED DESCRIPTION

Figure 1:
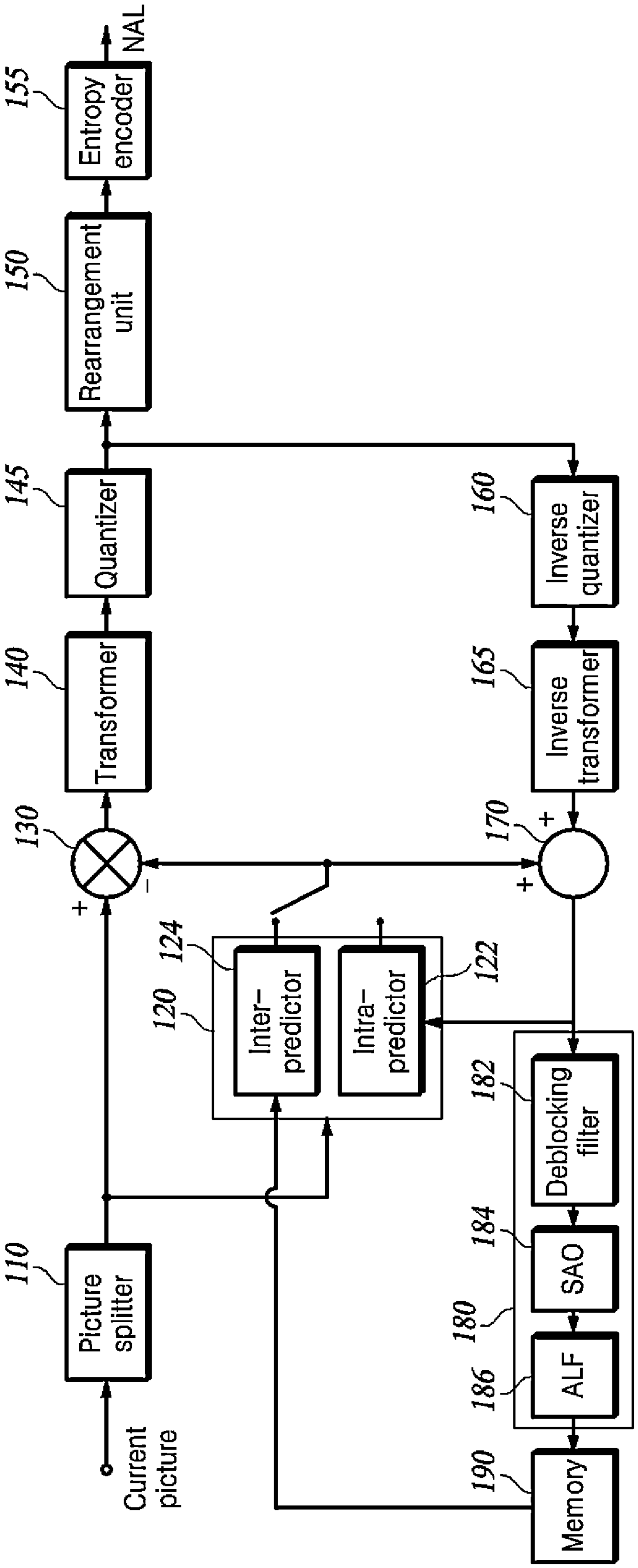
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
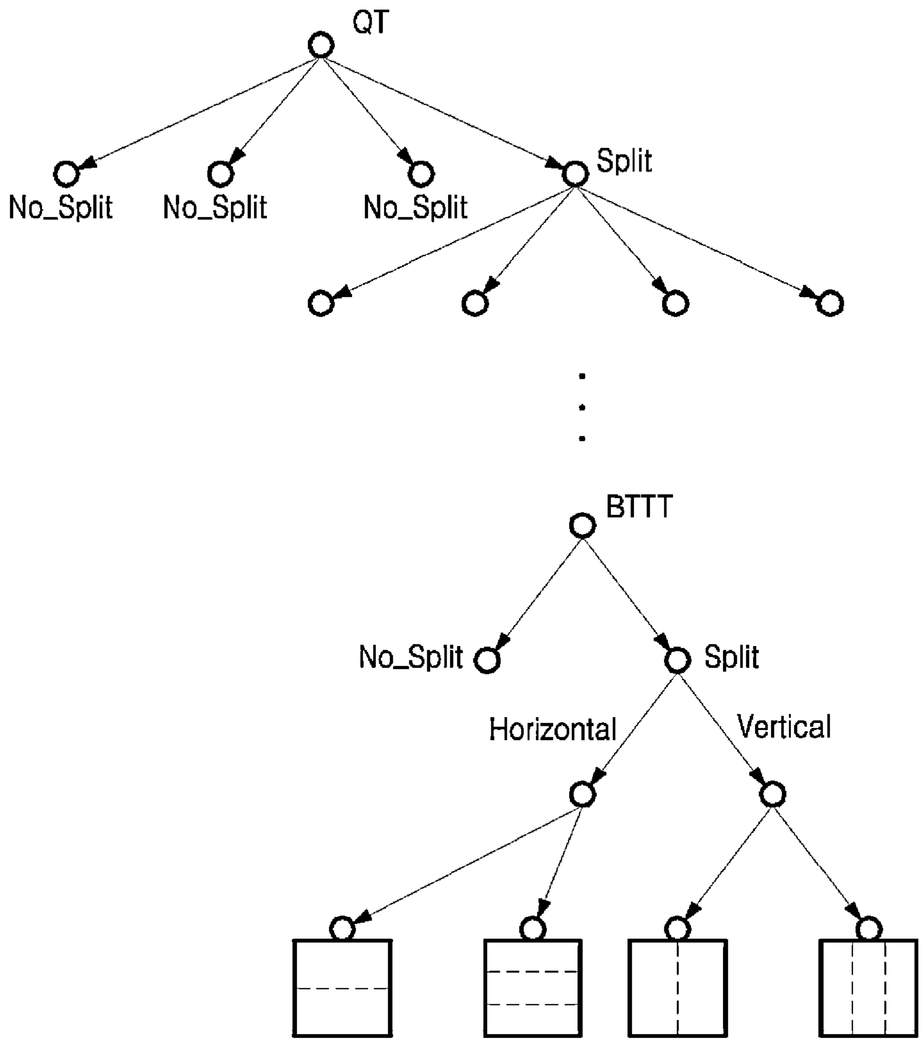
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
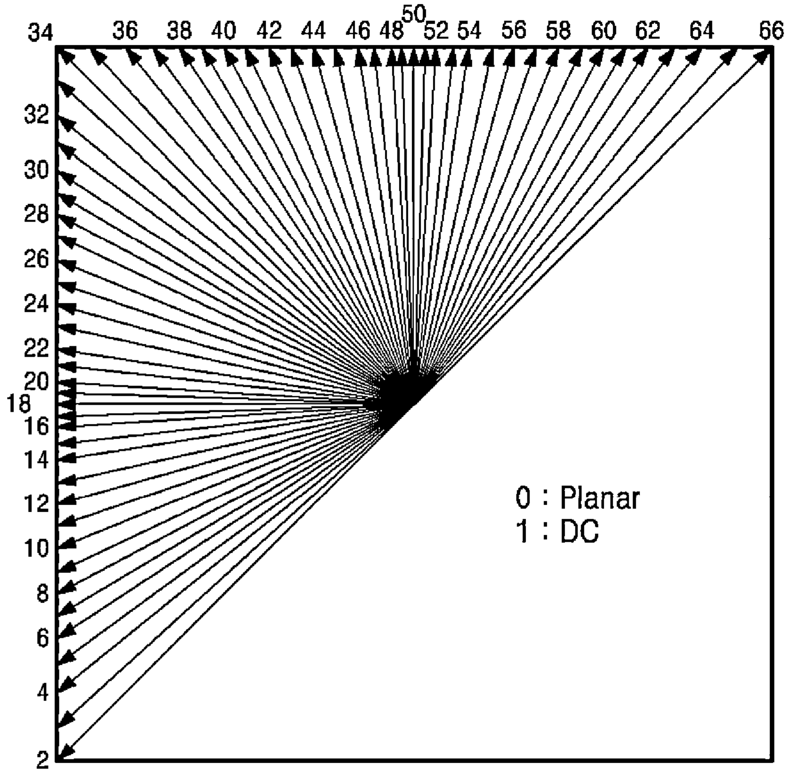
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
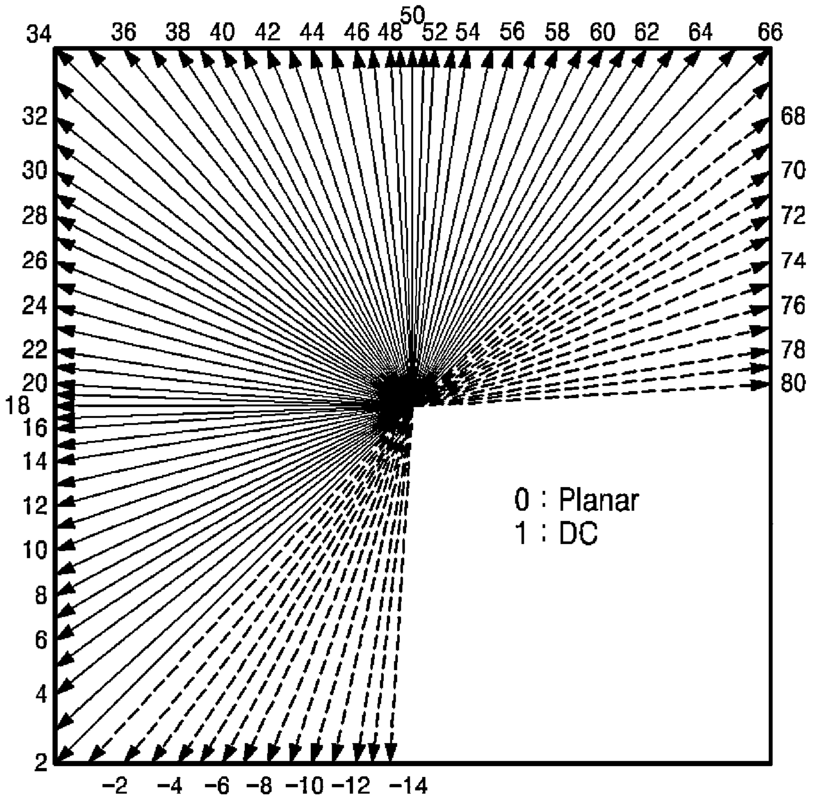

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
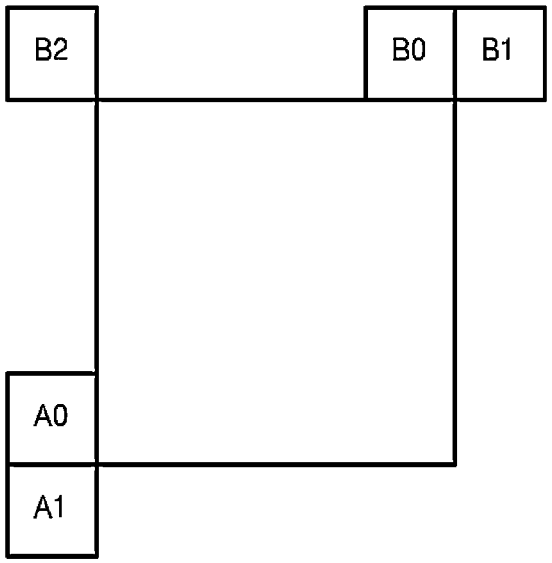
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
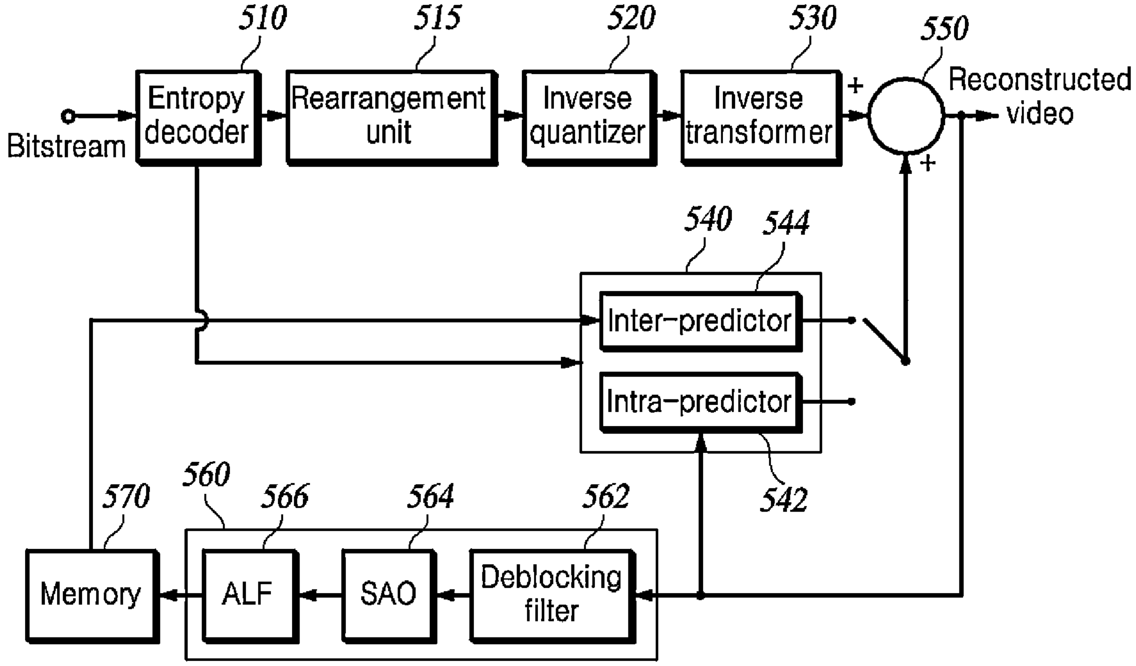
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bit-stream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video encoding method and an apparatus for selecting a precision mode for directionality of the intra prediction mode of the current block according to directional prediction modes of restored neighboring blocks. The video encoding method and the apparatus adaptively use precision of the directionality based on the selected precision mode in intra prediction of the current block.

The following embodiments may be applied to an intra predictor 122 in the video encoding apparatus. Further, the embodiments may be applied to the entropy decoder 510 and the intra predictor 542 in the video decoding apparatus.

In the following description, the term 'target block' to be encoded/decoded may be used in the same meaning as the current block or coding unit (CU) as described above, or the term 'target block' may mean a partial region of the coding unit.

Hereinafter, a specific flag of true indicates that a value of the corresponding flag is 1, and the specific flag of false indicates that the value of the corresponding flag is 0.

Hereinafter, the embodiments are described focusing on intra prediction in the video encoding apparatus. Such intra prediction may be performed by the intra predictor 122 in the video encoding apparatus, as described above. On the other hand, the video decoding apparatus is referred to, when necessary for convenience of description. Nonetheless, most of the embodiments to be described below can be similarly applied to the intra predictor 542 in the video decoding apparatus with the same or slight modification. Meanwhile, the video encoding apparatus determines information (flags and indexes to be described below) related to the intra prediction in terms of rate distortion optimization. Thereafter, the video encoding apparatus may encode the information to generate a bitstream and then may signal the bitstream to the video decoding apparatus. Further, the video encoding apparatus may acquire the information related to the intra prediction from a high level and perform intra prediction of the current block.

I. Intra Prediction

In the intra prediction of the Versatile Video Coding (VVC) technology, the intra prediction mode includes subdivided directional modes (i.e., 2 to 66), in addition to the non-directional modes (i.e., Planar and DC), as illustrated in FIG. 3A. Further, the intra prediction mode includes directional modes (−14 to −1 and 67 to 80) according to wide-angle intra prediction, as added to the example of FIG. 3B.

Hereinafter, the directional mode and the directional prediction mode may be used interchangeably.

Further, the intra prediction may generate a predictor based on a predefined matrix operation using neighboring pixels of the current block and encoding information of the current block. Such a rule-based prediction method is called MIP (Matrix weighted Intra Prediction).

Figure 6:
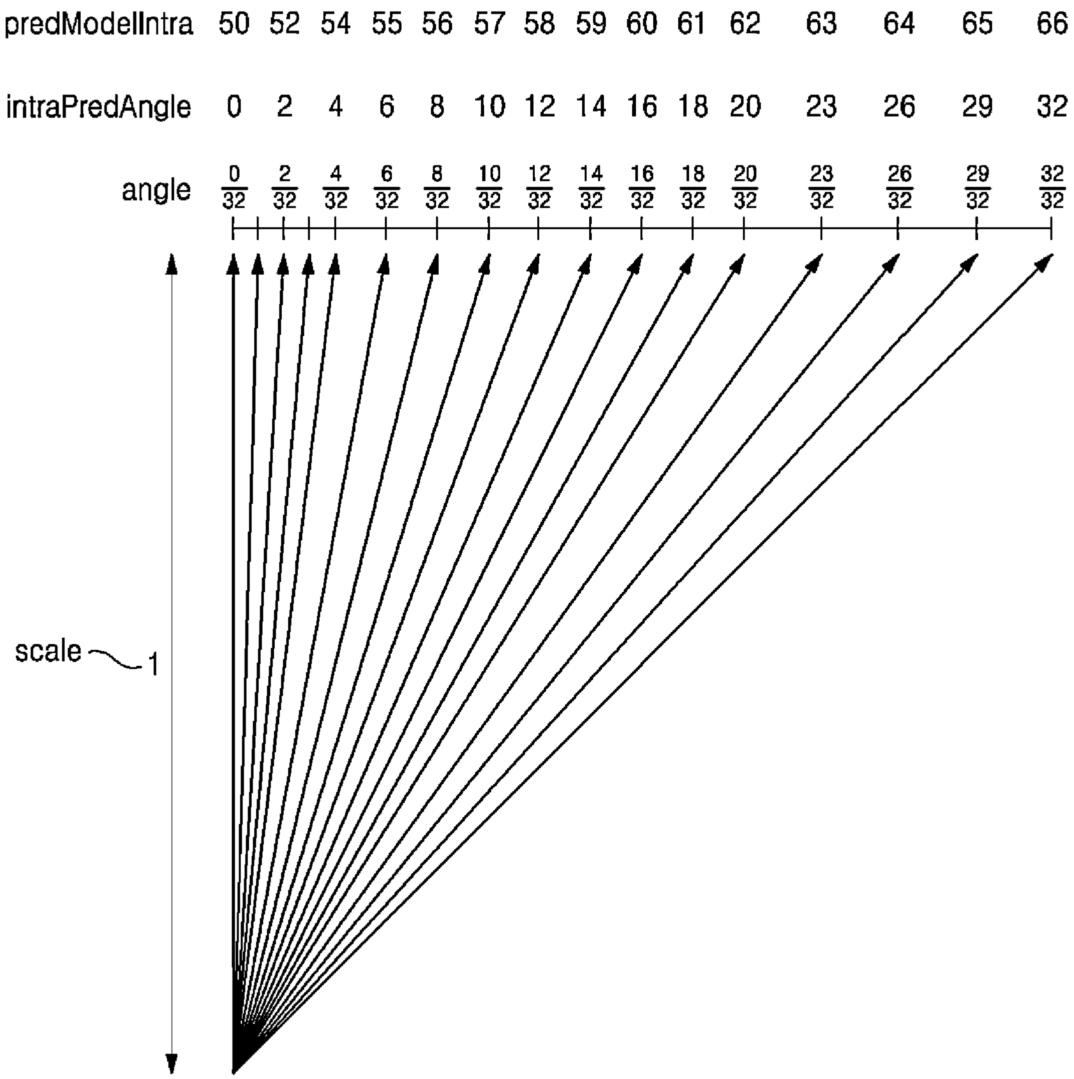
FIG. 6 is an illustrative diagram illustrating directionality according to an intra prediction mode.

FIG. 6 is an illustrative diagram illustrating directionality according to the intra prediction mode.

The intra predictor 122 in the video encoding apparatus may generate the prediction block of the current block by using various directionalities according to a directional mode at the time of the intra prediction.

As illustrated in FIG. 6, directionalities of the intra prediction modes corresponding to 50 to 66 may be expressed. Hereinafter, in the example of FIG. 6, the intra prediction mode may be represented by predModeIntra, and the directionality may be represented by an angle or intraPredAngle representing the angle. Further, each directionality is expressed with 1/32 precision. For example, when the intra prediction mode of the current block is 63, a value of intraPredAngle is 23. Therefore, when a scale value is 1, an actual value of the angle becomes 23/32. The scale value represents a distance between a reference sample line and a sample to be currently predicted in units of pixels.

Figure 7:
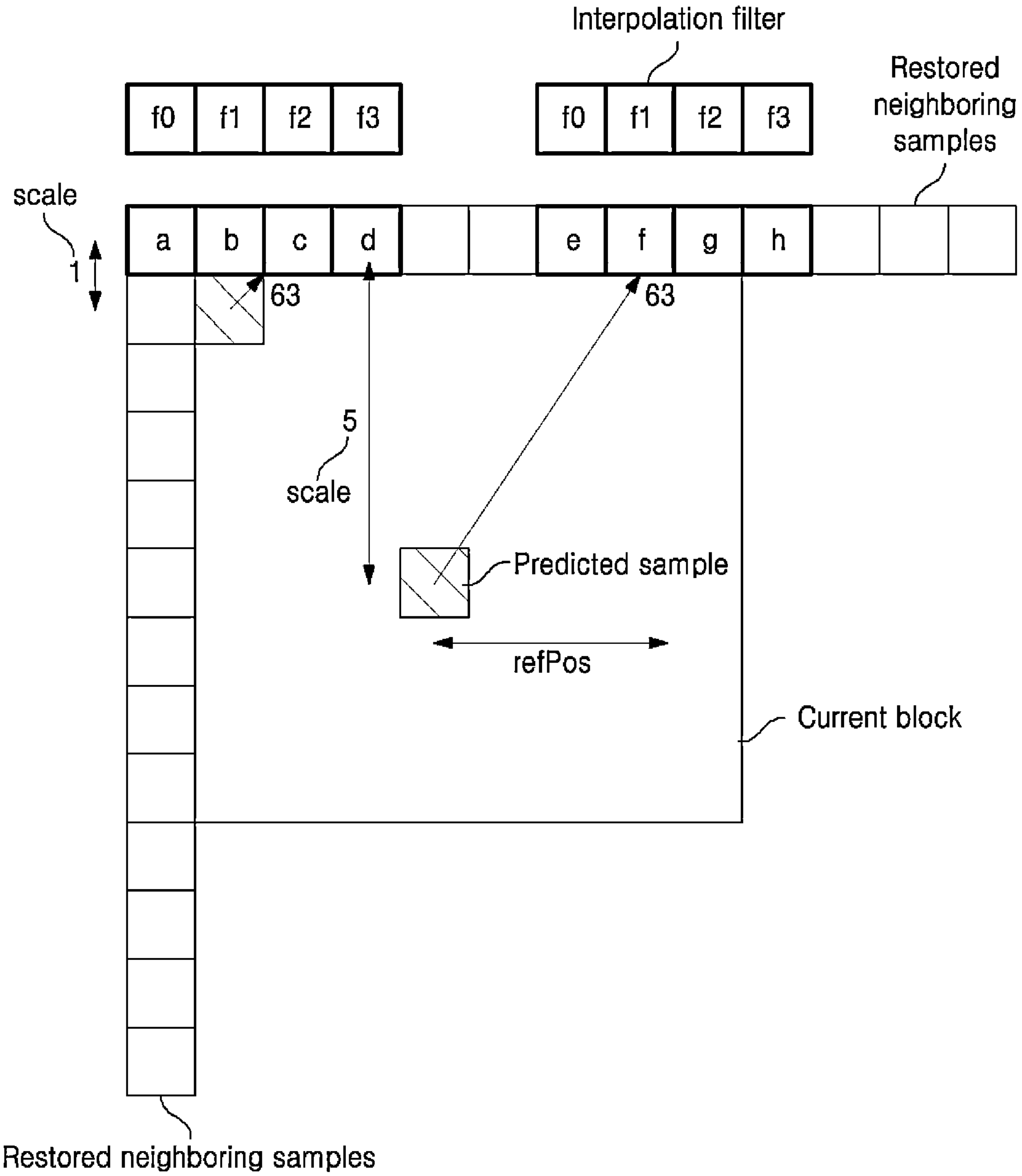
FIG. 7 is an illustrative diagram illustrating an intra prediction process when the intra prediction mode is 63.

FIG. 7 is an illustrative diagram illustrating an intra prediction process when the intra prediction mode is 63.

In the example of FIG. 7, the scale value is 5 because a predicted sample is 5 samples away from a restored neighboring sample. The intra predictor 122 may calculate a position of a reference sample among restored neighboring samples by multiplying the scale value by the intraPredAngle value. The intra predictor 122 may acquire a reference sample position refPos according to Equation 1.

$$refPos=(scale\cdot intraPredAngle)\gg 5 \quad \text{[Equation 1]}$$

The intra predictor 122 may generate predicted samples using values of e, f, g, and h samples, which are restored neighboring samples at positions −1, 0, +1, and +2 with respect to the refPos. In this case, an interpolation filter may be used. The interpolation filter may have filter coefficients such as f0, f1, f2, and f3. The interpolation filter may have different filter coefficients according to the phase refPhase calculated using the scale and intraPredAngle. The phase refPhase can be calculated as in Equation 2.

$$refPhase=(scale\cdot intraPredangle)\%(1\ll 5) \quad \text{[Equation 2]}$$

Here, since a product of the scale and intraPredAngle is a position of the reference sample represented by 1/32 pixel, a remainder obtained by dividing the product of the scale and intraPredAngle by 32 may be a phase. refPhase can have a value of 0 to 31. Thus, the interpolation filter can be implemented using one of 32 different groups of filter coefficients. The video encoding apparatus and the video decoding apparatus may use the same interpolation filter according to a prior agreement. Meanwhile, interpolation filters having different filter coefficients for each of luma signals and chroma signals may be used.

II. Adaptive Intra Prediction Precision

Figure 8A:
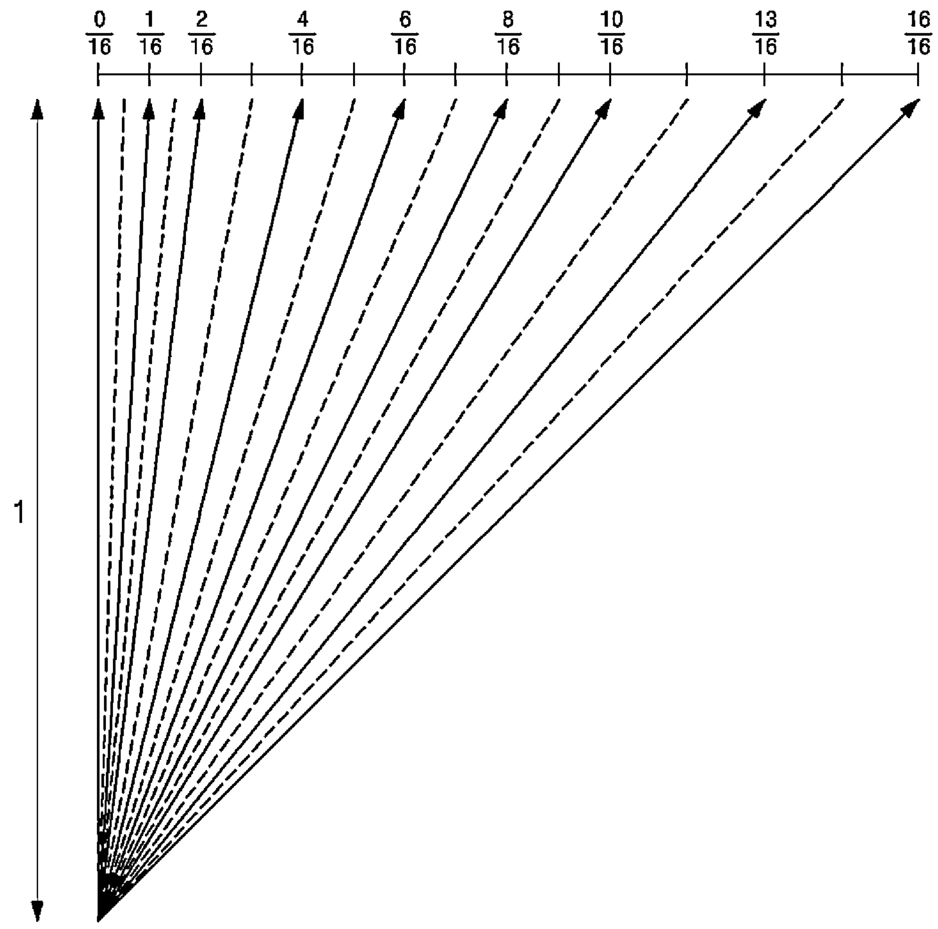
FIGS. 8A, 8B, and 8C are illustrative diagrams illustrating directionality expressed with 1/16, 1/32, and 1/64 sample precision for a preset 45 degree section.
Figure 8B:
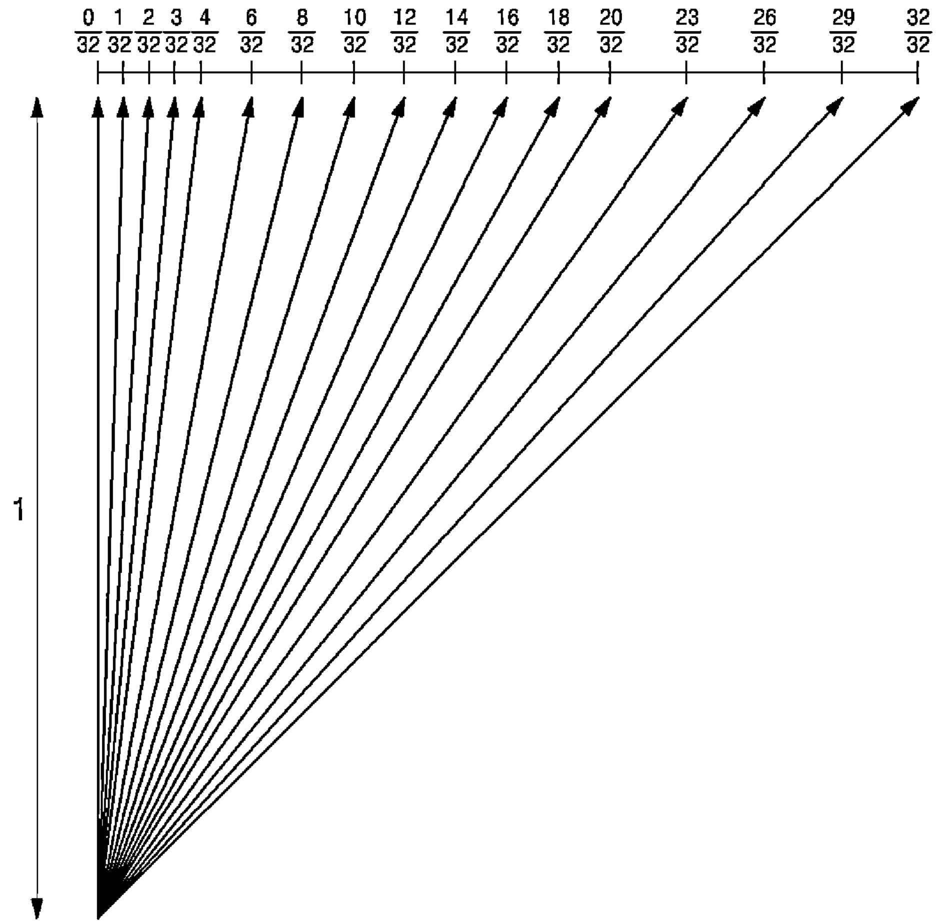
Figure 8C:
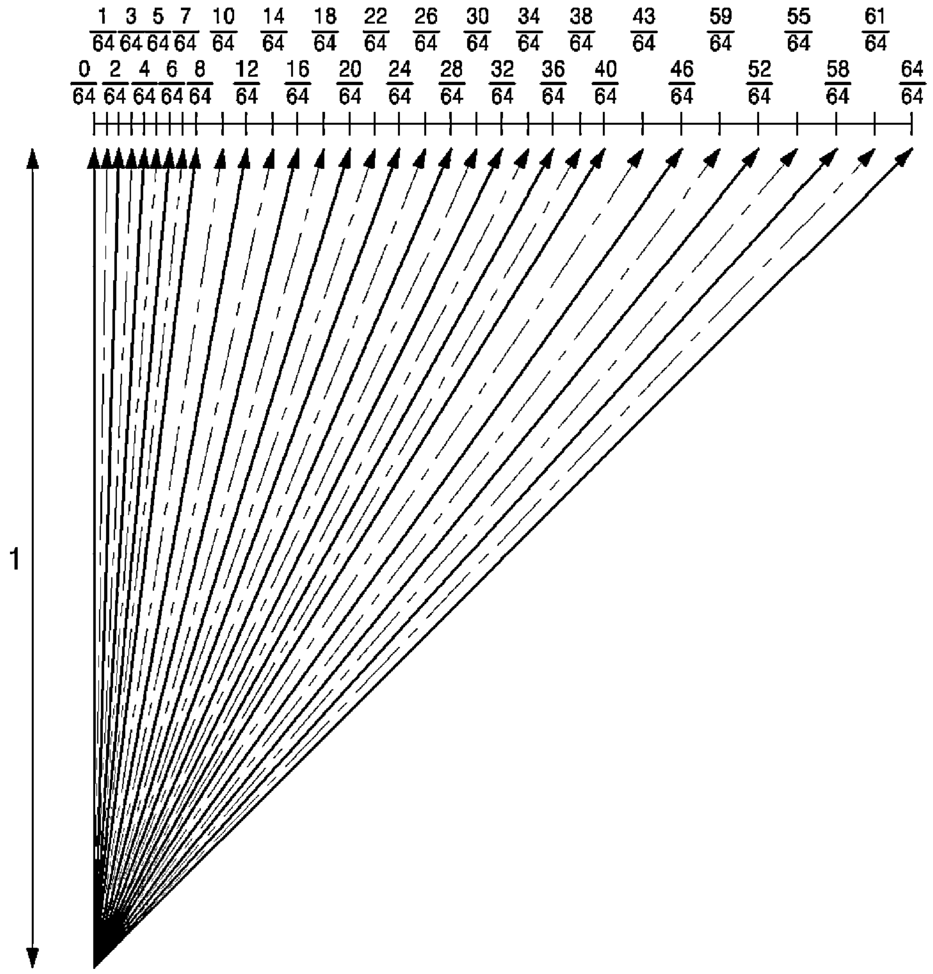

FIGS. 8A, 8B, and 8C are illustrative diagrams illustrating directionality expressed with 1/16, 1/32, and 1/64 sample precision for a preset 45 degree section.

As illustrated in FIG. 8B, an angle of 45 degrees in a preset section may be divided into 16 directionalities. Alternatively, 32 directionalities may be used for a predefined section, as illustrated in FIG. 8C, by further dividing an angle obtained by dividing the angle of 45 degrees into 16 directionalities. When the 32 directionalities are used, refPos and refPhase can be expressed with 1/64 sample precision. Alternatively, as illustrated in FIG. 8A, 45 degrees may be divided into 8 directionalities and used, and refPos and refPhase may be expressed with 1/16 sample precision.

Hereinafter, 1/64 sample precision is referred to as high precision, 1/16 sample precision is referred to as low precision, and 1/32 sample precision is referred to as reference precision. Further, information indicating whether or not the precision is adaptively used for the directionality of the intra prediction mode of the current block is referred to an adaptive precision flag adaptiveIntraFlag.

The video encoding apparatus may encode adaptiveIntraFlag and then may transfer resultant adaptiveIntraFlag to the video decoding apparatus. Alternatively, only when intra_luma_mpm_flag is 1, the video encoding apparatus may additionally encode adaptiveIntraFlag. Here, intra_luma_mpm_flag is a flag indicating whether to use one of neighboring intra prediction modes as the intra prediction mode of the current block. As another example, the video encoding apparatus may additionally encode adaptiveIntraFlag with respect to a preset size and shape of the current block.

Meanwhile, when adaptiveIntraFlag is 1, 1/16 or 1/64 sample precision may be used, and when adaptiveIntraFlag is 0, 1/32 sample precision may be used.

When adaptiveIntraFlag is 1, the video encoding apparatus may determine sample precision of the current block based on directional prediction mode information of neighboring blocks. When 93 prediction modes as illustrated in FIG. 3B are classified into two groups and a prediction mode classification of the current block is the same as a statistical prediction mode classification of the neighboring block, the video encoding apparatus may determine 1/64 sample precision. On the other hand, when the prediction mode classification of the current block is different from the statistical prediction mode classification of the neighboring block, 1/16 sample precision may be determined. Here, the 93 directional modes can be classified into two groups as follows. In the example of FIG. 3B, with reference to 34, which is a prediction mode in a direction of 135 degrees representing the top-left direction, a prediction mode smaller than 34 is classified into a prediction mode having a horizontal directionality. A prediction mode greater than or equal to 34 is classified into a prediction mode having a vertical directionality. Meanwhile, the classification of the horizontal directional prediction mode and the vertical directional prediction mode based on the top-left prediction mode 34 may be equally applied even when directional modes according to wide-angle intra prediction are considered.

When 1/16 sample precision is used, 16 different interpolation filters can be used for intra prediction, and when 1/64 sample precision is used, 64 different interpolation filters can be used for intra prediction. The video encoding apparatus and the video decoding apparatus may use the same interpolation filter according to a prior agreement. Coefficients of the respective interpolation filters may be stored and managed in the form of a table indicated by refPhase.

Meanwhile, when the intra predictor 122 searches for the intra prediction mode of the current block, the intra predictor 122 may select one of a vertical precision mode, a horizontal precision mode, or a normal precision mode and may then use the selected precision.

Figure 9:
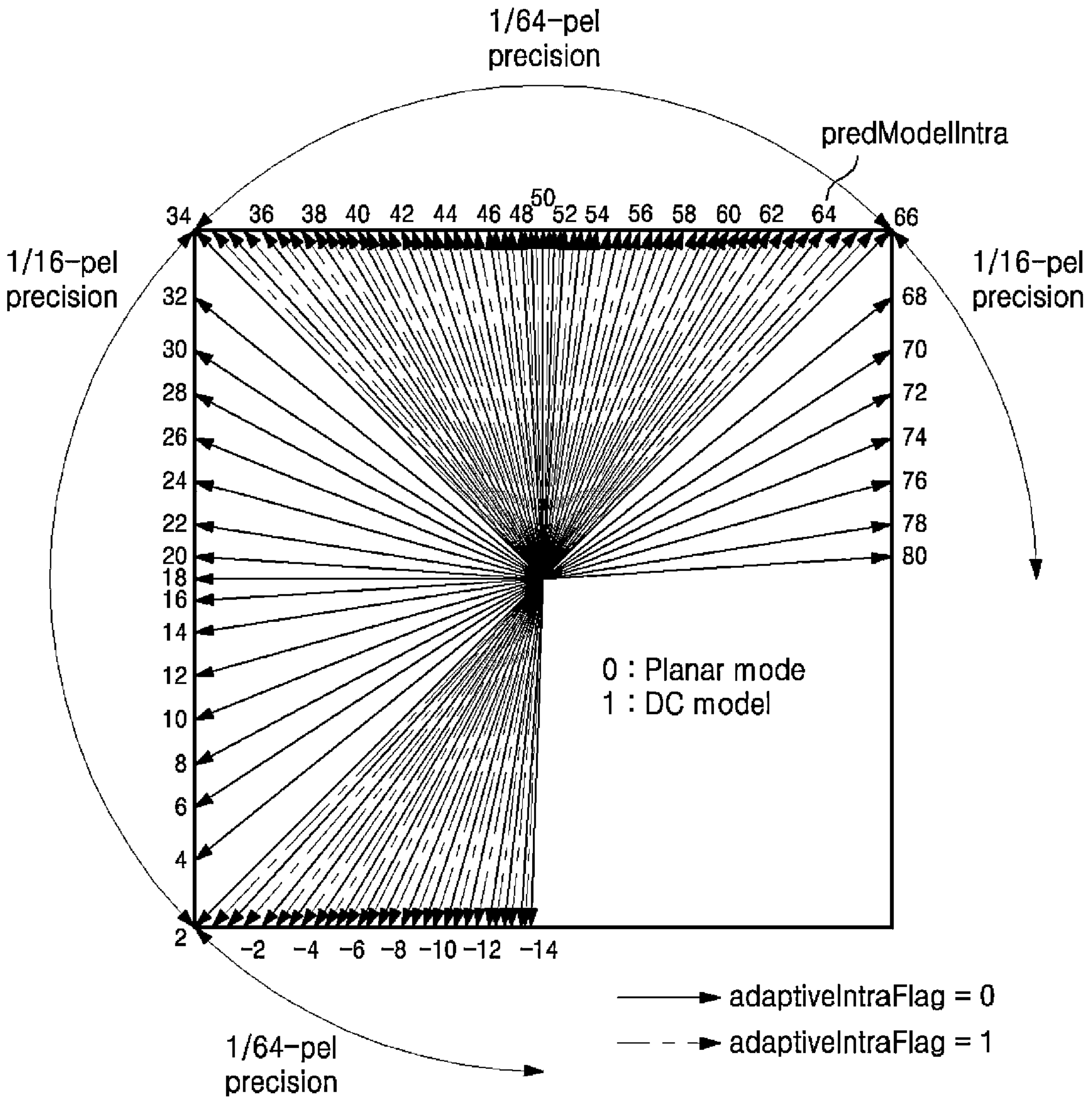
FIG. 9 is an illustrative diagram illustrating directionalities of intra prediction used in a vertical precision mode according to an embodiment of the present disclosure.

FIG. 9 is an illustrative diagram illustrating directionalities of the intra prediction used in a vertical precision mode according to an embodiment of the present disclosure. The vertical precision mode is a precision mode in which directionality with the high precision (1/64 sample precision) is used for sections including vertical directional prediction modes, and directionality with the low precision (1/16 sample precision) is used for sections including horizontal directional prediction modes. When the vertical directional intra prediction modes are used in many neighboring blocks, the directionality with the high precision is used for the vertical directionalities and the directionality with the low precision is used for the horizontal directionalities, so that coding efficiency can be improved.

On the other hand, as illustrated in FIG. 9, for the vertical directionalities, when the adaptive precision flag adaptiveIntraFlag is 0, the reference precision (1/32 sample precision) may be used, and when adaptiveIntraFlag is 1, high precision may be used. Further, for the horizontal directionalities, when adaptiveIntraFlag is 0, the reference precision may be used, and when adaptiveIntraFlag is 1, low precision may be used.

As another embodiment, adaptiveIntraFlag is used to apply the high precision to the vertical directionalities, and the reference precision may always be applied to the horizontal directionalities.

As another embodiment, the video encoding apparatus may use two adaptive precision flags to indicate whether or not to use the high precision and whether or not to use the low precision.

Meanwhile, when the low precision is applied to the horizontal directionalities in the vertical precision mode, the horizontal directionalities representing the intra prediction mode are not limited to the horizontal directionalities of 4 to 32 as illustrated in FIG. 9. In order to express intra prediction mode with the low precision, the same number of horizontal directionalities as in the example of FIG. 9 may be set differently from the example of FIG. 9. In this case, these horizontal directionalities may be shared between the video encoding apparatus and the video decoding apparatus in advance.

Figure 10:
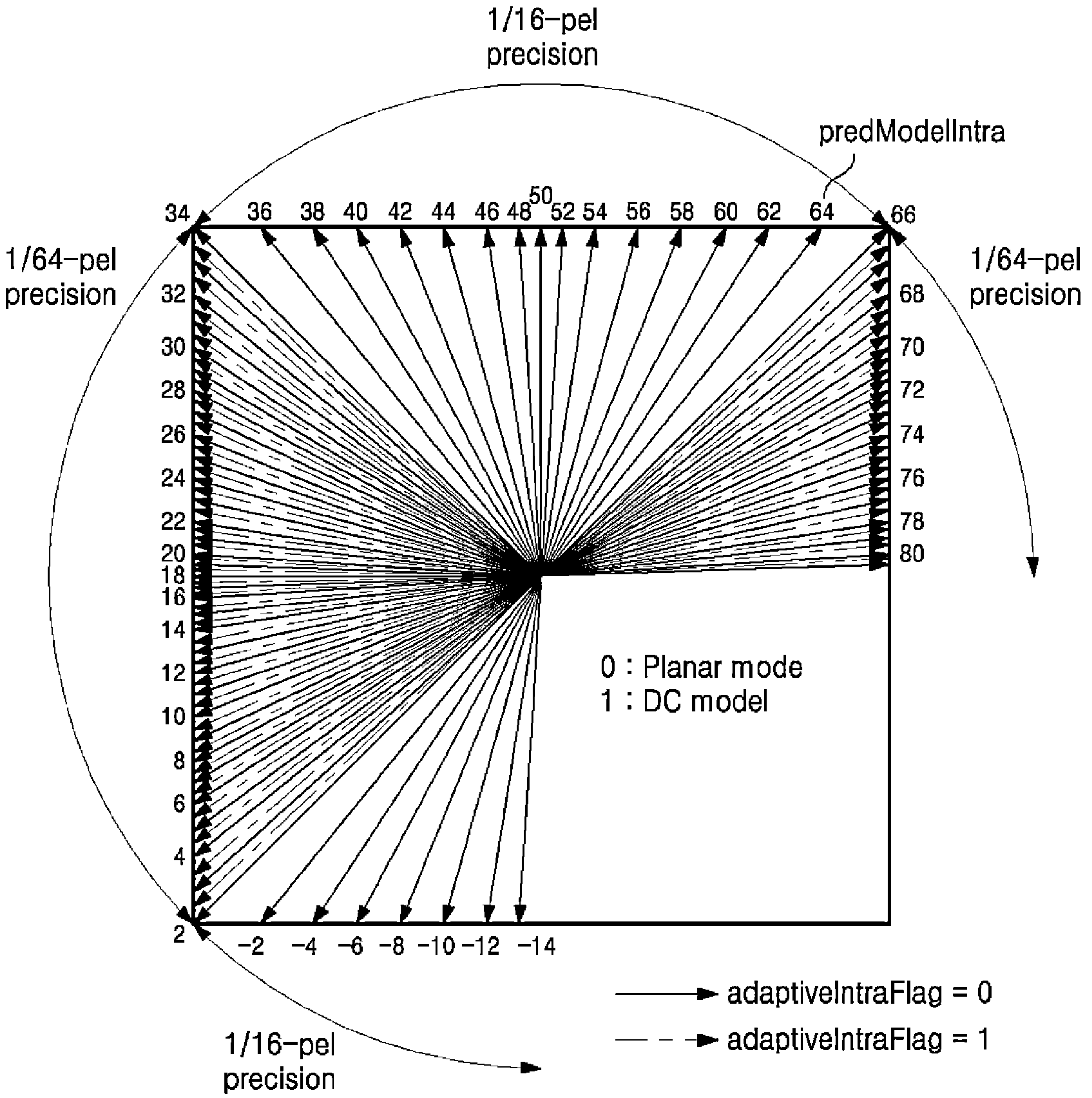
FIG. 10 is an illustrative diagram illustrating directionalities of the intra prediction used in a horizontal precision mode according to an embodiment of the present disclosure.

FIG. 10 is an illustrative diagram illustrating directionalities of the intra prediction used in a horizontal precision mode according to an embodiment of the present disclosure.

The horizontal precision mode is a precision mode in which directionality with the high precision (1/64 sample precision) is used for sections including horizontal directional prediction modes, and directionality with the low precision (1/16 sample precision) is used for sections including vertical directional prediction modes. When the horizontal directional intra prediction modes are used in many neighboring blocks, the directionality with the high precision is used for the horizontal directionalities and the directionality with the low precision is used for the vertical directionalities, so that coding efficiency can be improved.

Further, as illustrated in FIG. 10, for the horizontal directionalities, when the adaptive precision flag adaptiveIntraFlag is 0, the reference precision (1/32 sample precision) may be used, and when adaptiveIntraFlag is 1, the high precision may be used. Further, for the vertical directionalities, when adaptiveIntraFlag is 0, the reference precision may be used, and when adaptiveIntraFlag is 1, the low precision may be used.

As another embodiment, adaptiveIntraFlag may be used to apply the high precision to the horizontal directionalities, and the reference precision may always be applied to the vertical directionalities.

As another embodiment, the video encoding apparatus may use two adaptive precision flags to indicate whether or not to use the high precision and whether or not to use the low precision, as described above.

Meanwhile, when the low precision is applied to the vertical directionalities in the horizontal precision mode, the vertical directionalities representing the intra prediction mode are not limited to the vertical directionalities of 36 to 64 as illustrated in FIG. 10. In order to express the intra prediction mode with the low precision, the same number of vertical directionalities as in the example of FIG. 10 may be set differently from the example of FIG. 10. In this case, these vertical directionalities may be shared between the video encoding apparatus and the video decoding apparatus in advance.

In the normal precision mode, the directionality with the reference precision (1/32 sample precision) can be used for prediction modes as illustrated in FIG. 3B. Therefore, the adaptive precision flag is not used in the normal precision mode.

Figure 11A:
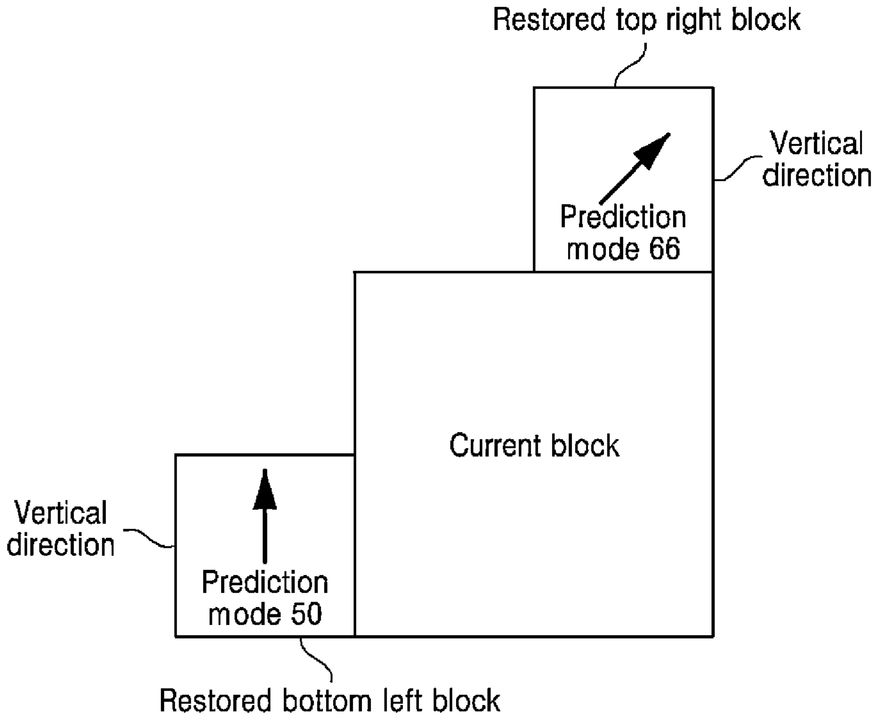
FIGS. 11A, 11B, and 11C are illustrative diagrams illustrating precision modes based on prediction modes of neighboring blocks according to an embodiment of the present disclosure.
Figure 11B:
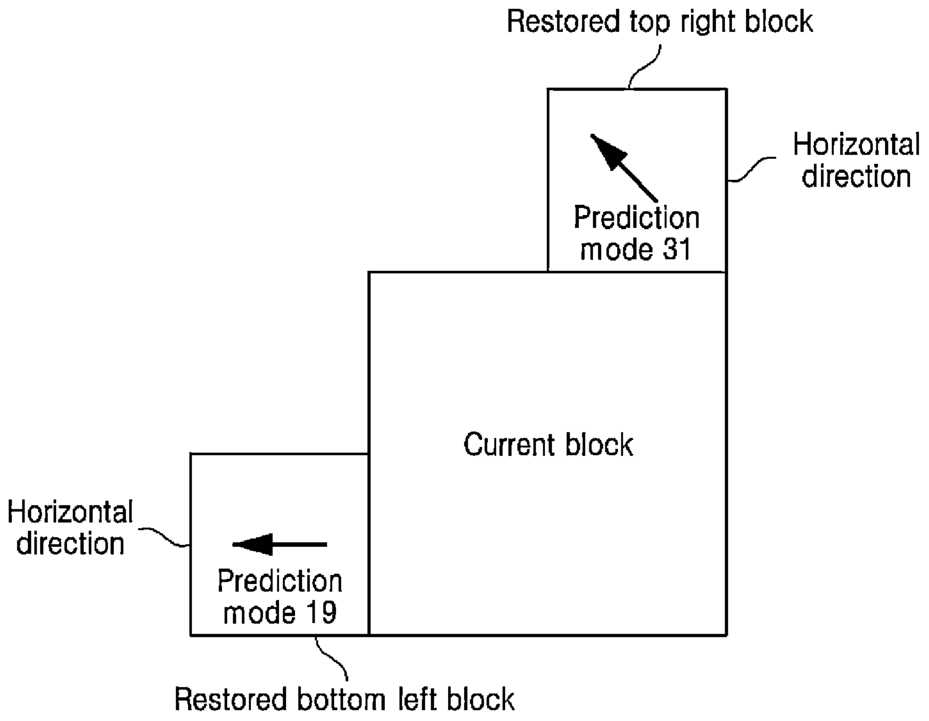
Figure 11C:
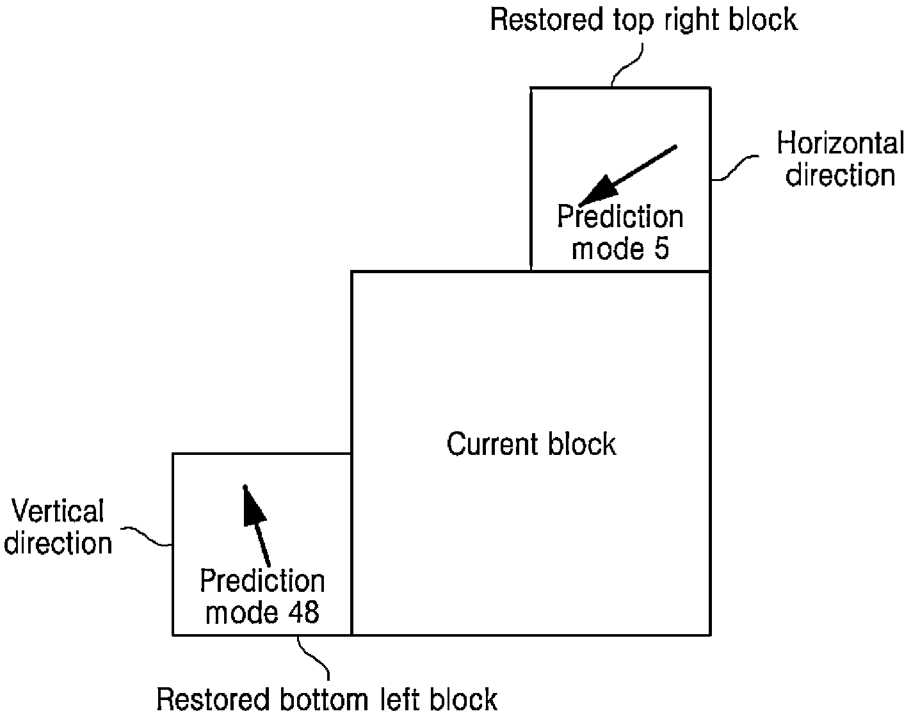

FIGS. 11A, 11B, and 11C are illustrative diagrams illustrating precision modes based on prediction modes of neighboring blocks according to an embodiment of the present disclosure.

In the example of FIG. 11A, since both a bottom left block and a top right block of the current block use vertical directional prediction modes, the vertical precision mode may be determined for the directional prediction mode of the current block. In the example of FIG. 11B, since both the bottom left block and the top right block of the current block use horizontal directional prediction modes, the horizontal precision mode may be determined for the directional prediction mode of the current block. Meanwhile, in the example of FIG. 11C, since the neighboring blocks of the current block use both the vertical directional prediction mode and the horizontal directional prediction mode, the normal precision mode may be determined for the directional prediction mode of the current block.

Hereinafter, a video encoding method and a video decoding method using the adaptive intra prediction precision are described using illustrations of FIGS. 12 and 13.

Figure 12:
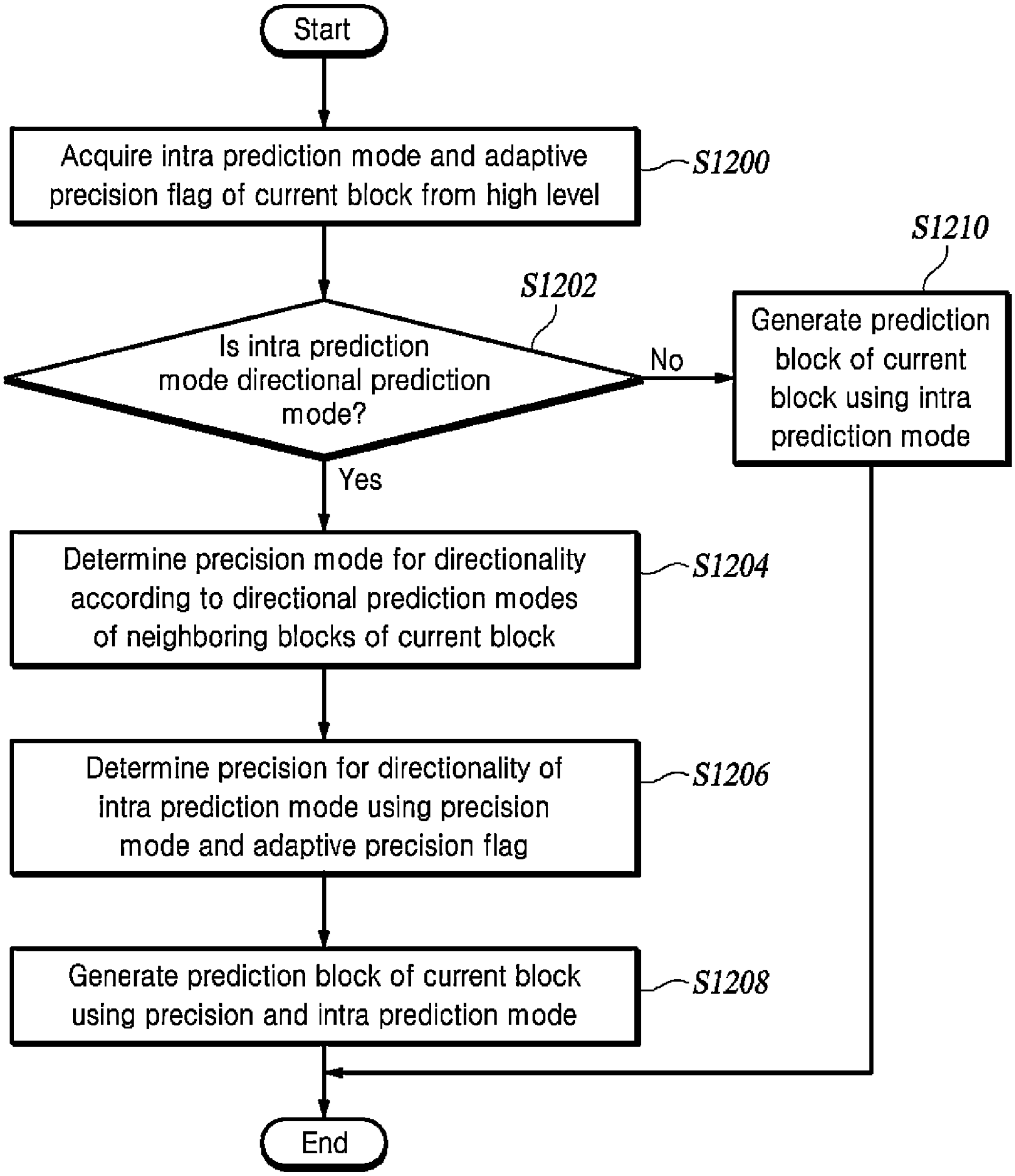
FIG. 12 is a flowchart illustrating a video encoding method using adaptive intra prediction precision according to an embodiment of the present disclosure.

FIG. 12 is a flowchart illustrating a video encoding method using the adaptive intra prediction precision according to an embodiment of the present disclosure.

The video encoding apparatus acquires the intra prediction mode and the adaptive precision flag of the current block from the high level (S1200). Here, the adaptive precision flag adaptiveIntraFlag indicates whether or not to use adaptive precision for the directionality of the intra prediction mode. Further, the intra prediction mode may be classified into the horizontal directional prediction mode and the vertical directional prediction mode with reference to the top-left intra prediction mode.

The video encoding apparatus checks the intra prediction mode (1202).

When the intra prediction mode is the directional prediction mode (Yes in S1202), the video encoding apparatus performs the following steps.

The video encoding apparatus determines the precision mode for the directionality according to the directional prediction modes of the neighboring blocks of the current block (S1204).

The video encoding apparatus may determine one of the vertical precision mode, the horizontal precision mode, or the normal precision mode to be a precision mode for the directionality of the intra prediction mode.

First, in the vertical precision mode, the directionality with the high precision or the reference precision may be used for the vertical directional prediction modes based on the adaptive precision flag, as illustrated in FIG. 9. Further, the directionality with the low precision or the reference precision may be used for the horizontal directional prediction modes based on the adaptive precision flag. In this case, the high precision may be 1/64 sample precision, the low precision may be 1/16 sample precision, and the reference precision may be 1/32 sample precision. Next, in the horizontal precision mode, the directionality with the high precision or the reference precision may be used for the horizontal directional prediction modes based on the adaptive precision flag, as illustrated in FIG. 10. Further, the directionality with the low precision or the reference precision may be used for the vertical directional prediction modes based on the adaptive precision flag. Finally, in the normal precision mode, the directionality with the reference precision is used for intra prediction mode.

The video encoding apparatus determines the vertical precision mode as the precision mode when both the bottom left block and the top right block of the current block use the vertical directional prediction modes, as in the example of FIG. 11A. Alternatively, the video encoding apparatus may determine the horizontal precision mode as the precision mode when both the bottom left block and the top right block of the current block use the horizontal directional prediction modes, as illustrated in the example of FIG. 11B. Further, the video encoding apparatus may determine the normal precision mode as the precision mode, the bottom left block and the top right block of the current block use both the horizontal directional prediction mode and the vertical directional prediction mode, as in the example of FIG. 11C.

The video encoding apparatus determines the precision for the directionality of the intra prediction mode using the precision mode and the adaptive precision flag (S1206).

When the precision mode of the current block is the vertical precision mode and the intra prediction mode is the vertical directional mode, the video encoding apparatus determines the precision according to the adaptive precision flag. In other words, when the adaptive precision flag is 1, the precision may be determined as the high precision, and when the adaptive precision flag is 0, the precision may be determined as the reference precision.

Further, when the precision mode of the current block is the vertical precision mode and the intra prediction mode is the horizontal directional mode, the video encoding apparatus determines the precision according to the adaptive precision flag. In other words, when the adaptive precision flag is 1, the precision may be determined as the low precision, and when the adaptive precision flag is 0, the precision may be determined as the reference precision.

Meanwhile, when the precision mode of the current block is the horizontal precision mode and the intra prediction mode is the horizontal directional mode, the video encoding apparatus determines the precision according to the adaptive precision flag. In other words, when the adaptive precision flag is 1, the precision may be determined as the high precision, and when the adaptive precision flag is 0, the precision may be determined as the reference precision.

Further, when the precision mode of the current block is the horizontal precision mode and the intra prediction mode is the vertical directional mode, the video encoding apparatus determines the precision according to the adaptive precision flag. When the adaptive precision flag is 1, the precision may be determined as the low precision, and when the adaptive precision flag is 0, the precision may be determined as the reference precision.

As another embodiment, the video encoding apparatus may use two adaptive precision flags to indicate whether or not to use the high precision and whether or not to use the low precision.

The video encoding apparatus generates the prediction block of the current block using the precision and the intra prediction mode (S1208).

When the intra prediction mode is the non-directional prediction mode (No in S1202), the video encoding apparatus generates the prediction block of the current block using the intra prediction mode (S1210).

Figure 13:
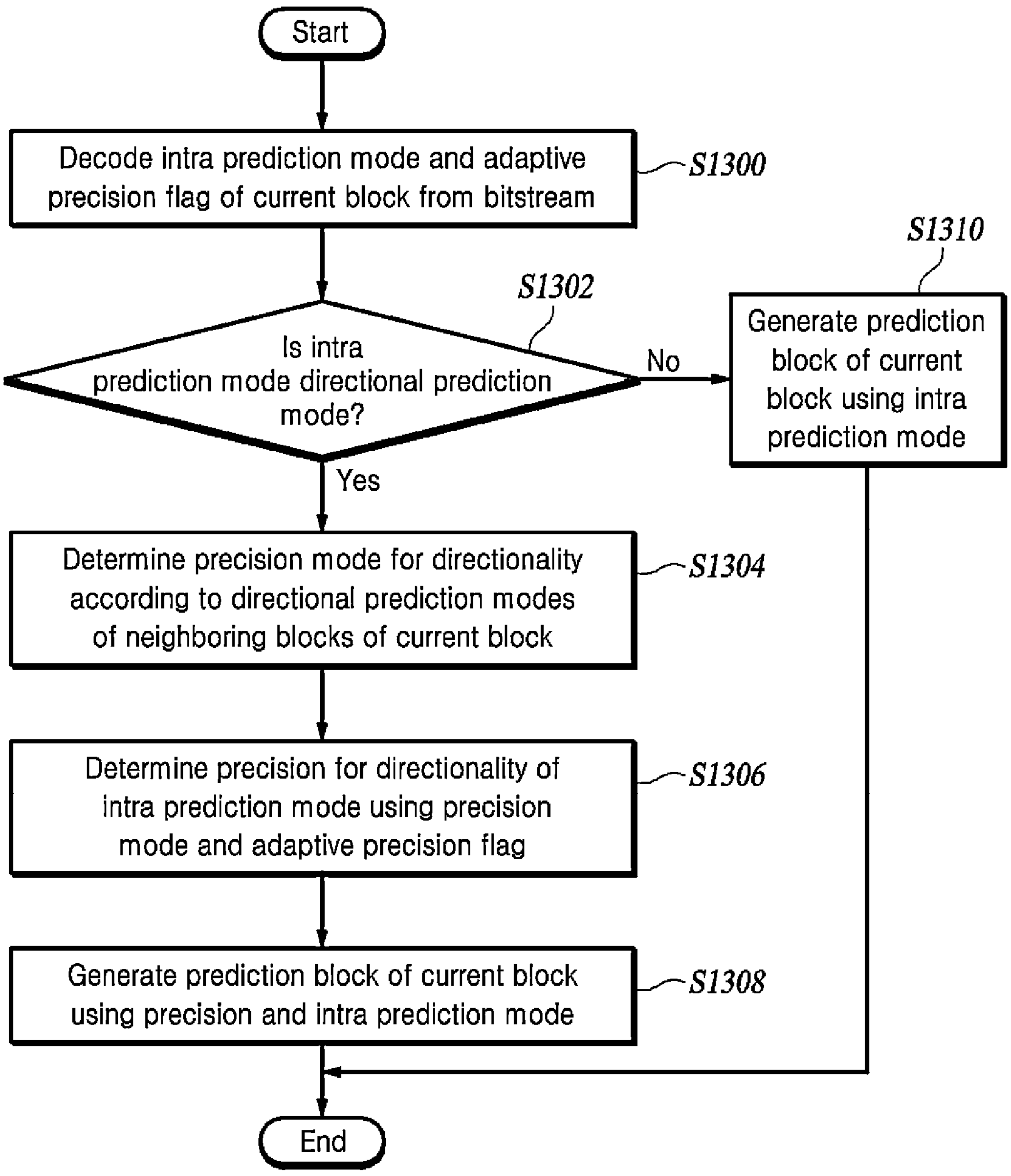
FIG. 13 is a flowchart illustrating a video decoding method using adaptive intra prediction precision according to an embodiment of the present disclosure.

FIG. 13 is a flowchart illustrating a video decoding method using adaptive intra prediction precision according to an embodiment of the present disclosure.

The video decoding apparatus decodes the intra prediction mode and the adaptive precision flag of the current block from the bitstream (S1300). Here, the adaptive precision flag adaptiveIntraFlag indicates whether or not to use adaptive precision for the directionality of the intra prediction mode. Further, the intra prediction mode may be classified into the horizontal directional prediction mode and the vertical directional prediction mode with reference to the top-left intra prediction mode.

The video decoding apparatus checks the intra prediction mode (1302).

When the intra prediction mode is the directional prediction mode (Yes in S1302), the video decoding apparatus performs the following steps.

The video decoding apparatus determines the precision mode for directionality according to directional prediction modes of neighboring blocks of the current block (S1304). The video decoding apparatus may determine one of the vertical precision mode, the horizontal precision mode, or the normal precision mode as the precision mode for the direction of the intra prediction mode.

The video decoding apparatus determines the precision for the directionality of the intra prediction mode using the precision mode and the adaptive precision flag (S1306).

The video decoding apparatus generates the prediction block of the current block using the precision and the intra prediction mode (S1308).

When the intra prediction mode is the non-directional prediction mode (No in S1302), the video decoding apparatus generates the prediction block of the current block using the intra prediction mode (S1310).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

122: intra predictor
510: entropy decoder
542: intra predictor

What is claimed is:

1. An intra prediction method performed by a video decoding apparatus, the intra prediction method comprising:
- decoding an intra prediction mode and an adaptive precision flag of a current block from a bitstream, wherein the adaptive precision flag indicates whether or not to use adaptive precision for directionality of the intra prediction mode;
- checking the intra prediction mode;
- when the intra prediction mode is a directional prediction mode:
  - determining a precision mode for the directionality of the intra prediction mode of the current block based on whether prediction modes of neighboring blocks of the current block belong to vertical directional prediction modes or horizontal directional prediction modes;
  - determining precision for the directionality of the intra prediction mode using the precision mode and the adaptive precision flag; and
  - generating a prediction block of the current block using the precision and the intra prediction mode.

2. The intra prediction method of claim 1, wherein determining the precision mode includes:
- determining one of a vertical precision mode, a horizontal precision mode, or a normal precision mode as the precision mode for the directionality of the intra prediction mode.

3. The intra prediction method of claim 2, wherein the vertical precision mode uses directionality with high precision or reference precision for vertical directional prediction modes, and uses directionality with low precision or the reference precision for horizontal directional prediction modes.

4. The intra prediction method of claim 2, wherein the horizontal precision mode uses directionality with high precision or reference precision for horizontal directional prediction modes, and
- wherein the horizontal precision mode uses directionality with low precision or the reference precision for vertical directional prediction modes.

5. The intra prediction method of claim 2, wherein the normal precision mode uses directionality of reference precision for the intra prediction mode.

6. The intra prediction method of claim 3, wherein the high precision is 1/64 sample precision, the low precision is 1/16 sample precision, and the reference precision is 1/32 sample precision.

7. The intra prediction method of claim 3, wherein determining the precision mode includes:

determining the vertical precision mode as a precision mode for the directionality when both a bottom left block and a top right block of the current block use the vertical directional prediction modes.

8. The intra prediction method of claim 3, wherein determining the precision of the directionality includes:

determining the precision according to the adaptive precision flag when the precision mode is the vertical precision mode and the intra prediction mode is one of the vertical directional prediction modes, and wherein the precision is determined as the high precision when the adaptive precision flag is 1 and determined as the reference precision when the adaptive precision flag is 0.

9. The intra prediction method of claim 3, wherein determining the precision of the directionality includes:

determining the precision according to the adaptive precision flag when the precision mode is the vertical precision mode and the intra prediction mode is one of the horizontal directional prediction modes, and wherein the precision is determined as the low precision when the adaptive precision flag is 1 and determined as the reference precision when the adaptive precision flag is zero (0).

10. The intra prediction method of claim 4, wherein determining the precision mode includes:

determining the horizontal precision mode as the precision mode for the directionality when both a bottom left block and a top right block of the current block use the horizontal directional prediction modes.

11. The intra prediction method of claim 4, wherein determining the precision of the directionality includes:

determining the precision according to the adaptive precision flag when the precision mode is the horizontal precision mode and the intra prediction mode is one of the horizontal directional prediction modes, and wherein the precision is determined as the high precision when the adaptive precision flag is 1 and determined as the reference precision when the adaptive precision flag is zero (0).

12. The intra prediction method of claim 4, wherein determining the precision of the directionality includes:

determining the precision according to the adaptive precision flag when the precision mode is the horizontal precision mode and the intra prediction mode is one of the vertical directional prediction modes, and wherein the precision is determined as the low precision when the adaptive precision flag is 1 and determined as the reference precision when the adaptive precision flag is zero (0).

13. The intra prediction method of claim 2, wherein determining the precision mode includes:

determining the normal precision mode as the precision mode for the directionality when one of a bottom left block and a top right block of the current block uses the horizontal directional prediction modes and the other one of the bottom left block and the top right block of the current block uses the vertical directional prediction modes.

14. An intra prediction method performed by a video encoding apparatus, the intra prediction method comprising:

determining an intra prediction mode of a current block and whether or not to use adaptive precision for directionality of the intra prediction mode;

encoding an adaptive precision flag indicating whether or not to use adaptive precision for directionality of the intra prediction mode; and when the intra prediction mode is a directional prediction mode:

determining a precision mode for the directionality of the intra prediction mode of the current block based on whether prediction modes of neighboring blocks of the current block belong to vertical directional prediction modes or horizontal directional prediction modes;

determining precision for the directionality of the intra prediction mode based on the precision mode and whether or not to use adaptive precision for directionality of the intra prediction mode; and generating a prediction block of the current block using the precision and the intra prediction mode.

15. The intra prediction method of claim 14, wherein determining the precision mode includes:

determining one of a vertical precision mode, a horizontal precision mode, or a normal precision mode as the precision mode for the directionality of the intra prediction mode.

16. A method for transmitting a bitstream containing encoded video data, the method comprising:

generating the bitstream for a current block in an image; and transmitting the bitstream, wherein generating the bitstream for the image comprises:

determining an intra prediction mode of a current block and whether or not to use adaptive precision for directionality of the intra prediction mode;

encoding an adaptive precision flag indicating whether or not to use adaptive precision for directionality of the intra prediction mode; and when the intra prediction mode is a directional prediction mode:

determining a precision mode for the directionality of the intra prediction mode of the current block based on whether prediction modes of neighboring blocks of the current block belong to vertical directional prediction modes or horizontal directional prediction modes;

determining precision for the directionality of the intra prediction mode based on the precision mode and whether or not to use adaptive precision for directionality of the intra prediction mode; and generating a prediction block of the current block using the precision and the intra prediction mode.

* * * * *